Figure 3:
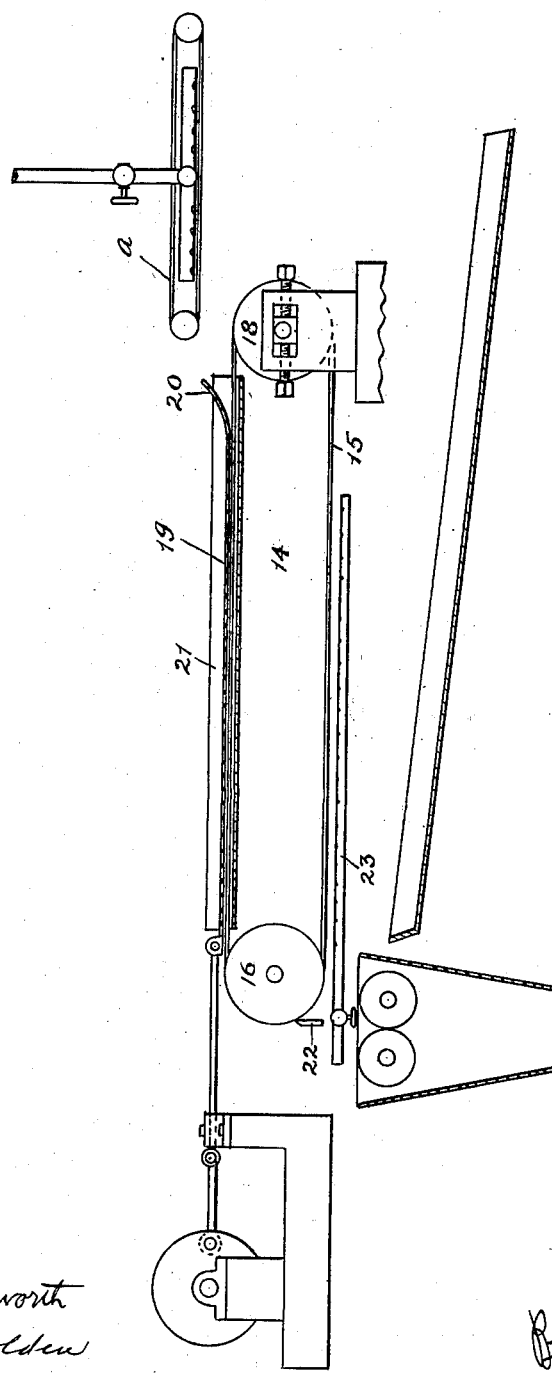

No. 741,257. PATENTED OCT. 13, 1903.
W. A. LAWRENCE.
APPARATUS FOR EXTRACTING GUM.
APPLICATION FILED AUG. 20, 1902.
NO MODEL. 2 SHEETS—SHEET 1.
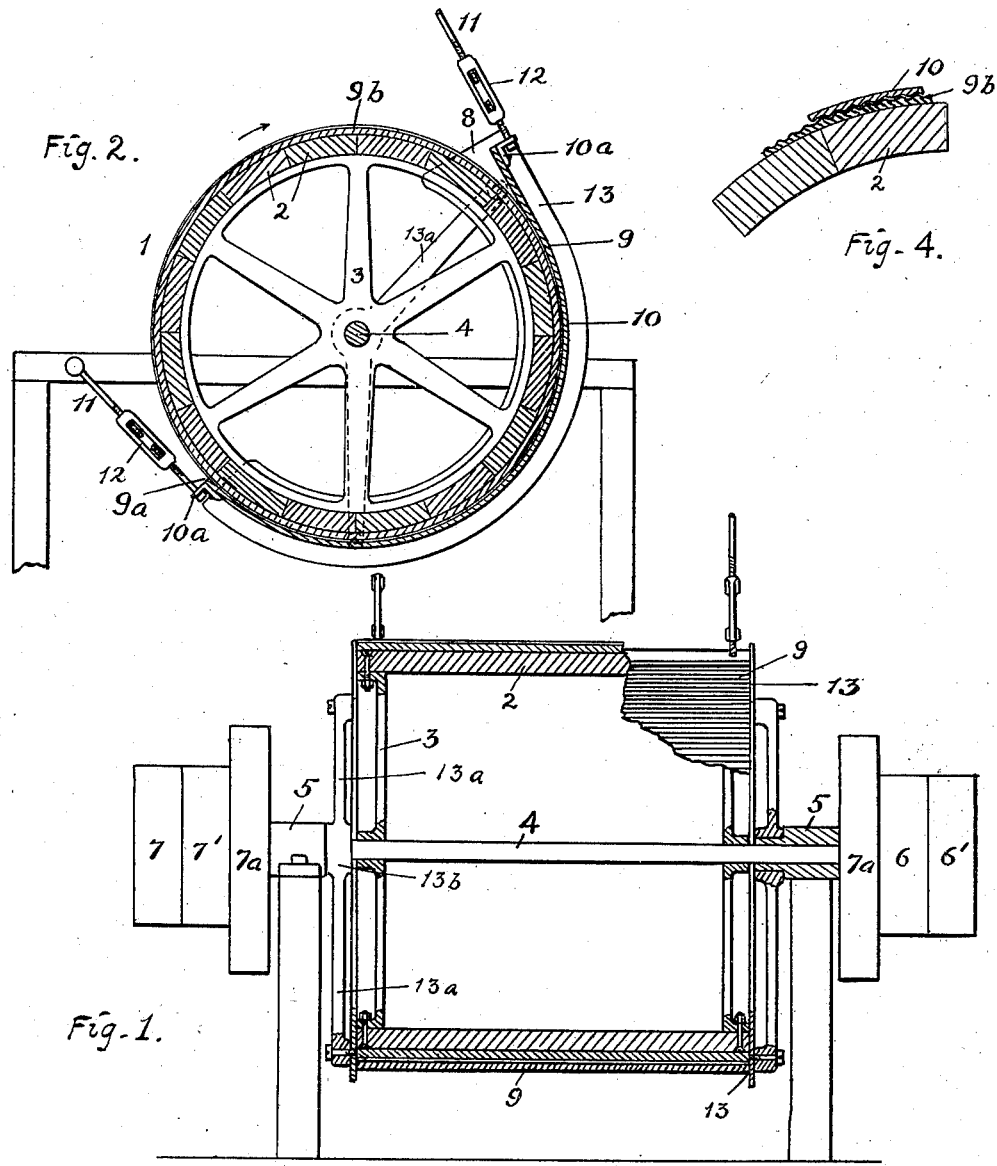
Witnesses:
Philip Farnsworth
Dios Holden
Inventor
Wm. A. Lawrence
by
Betts Betts Sheffield Betts
Attorneys.

No. 741,257. PATENTED OCT. 13, 1903.
W. A. LAWRENCE.
APPARATUS FOR EXTRACTING GUM.
APPLICATION FILED AUG. 20, 1902.

NO MODEL. 2 SHEETS—SHEET 2.

Witnesses:
Philip Farnsworth
Delos Holden

Inventor
Wm. A. Lawrence.
by
Betts Betts Sheffield Betts
Attorneys.

No. 741,257.	Patented October 13, 1903.

UNITED STATES PATENT OFFICE.

WILLIAM A. LAWRENCE, OF NEW YORK, N. Y., ASSIGNOR TO CONTINENTAL RUBBER COMPANY, OF JERSEY CITY, NEW JERSEY, A CORPORATION OF NEW JERSEY.

APPARATUS FOR EXTRACTING GUM.

SPECIFICATION forming part of Letters Patent No. 741,257, dated October 13, 1903.

Application filed August 20, 1902. Serial No. 120,367. (No model.)

*To all whom it may concern:*

Be it known that I, WILLIAM A. LAWRENCE, a resident of the borough of Queens, in the city and State of New York, have invented certain new and useful Improvements in Apparatus for Extracting Gum, of which the following is a specification.

My invention relates to apparatus for separating or extracting gums or gum-like substances from their vegetable sources and is adapted to be used in connection with a novel process for extracting rubber invented by me and for which I filed an application for patent on the 20th day of August, 1902, Serial No. 120,368. I do not limit myself in the use of this apparatus, however, to any specified materials to be operated upon, but desire to cover its use whenever applied to the extraction of gum or gum-like substances from their vegetable sources.

In the drawings which accompany this specification, Figure 1 is a longitudinal vertical section of the device forming the subject-matter of this application. Fig. 2 is a transverse section of the device of Fig. 1. Fig. 3 is a transverse section of a modified form of apparatus, and Fig. 4 is a detail view.

1 is a large drum constructed in a strong and substantial manner, preferably of wooden staves 2, firmly secured and held by the spiders 3. This drum is mounted on a shaft 4, supported in journals 5. The shaft is provided at one end with fixed and loose pulleys 6 and 6', whereby it may be readily driven in a forward direction from any suitable source of power, and with the fixed and loose pulleys 7 and 7', whereby by means of a crossed belt the drum may be driven in a reverse direction in case it is at any time desirable to do so in case of accidental clogging. Fly-wheels 7$^a$ may also be mounted upon the shaft 4, if desired. The drum is intended to rotate continuously in the direction indicated by the arrow and to thoroughly rub the material to be treated, which is fed in at 8 between the drum and an apron 9 or other body partially surrounding the drum and emerges at 9$^a$. For this reason the opposing surfaces of the drum and apron should be such that there will be considerable friction between them and the material treated. I therefore secure tightly and firmly upon the peripheral surface of the drum a thick band 9$^b$, which is preferably slightly corrugated or otherwise roughened. This band may be of rubber belting or other suitable material. The apron may be composed of a piece of similar belting 10, with small angle-iron cross-pieces 10$^a$ secured at each end. Wires or cords 11, provided with turnbuckles 12, as shown, are connected to the angle-irons 10$^a$ and serve to support the apron and to draw it toward the drum with any desired degree of pressure. The apron is of practically the same width as the drum, and the gum-bearing materials which are operated upon are prevented from escaping at their edges by guards 13, shown as curved plates covering said edges. The guards 13 may be supported by the arms 13$^a$, rigid or integral with a collar 13$^b$ on the journal-boxes 5.

It is of course evident that in place of the apron any body, either rigid or flexible, may be used, provided it surrounds a considerable portion of the drum and has a surface offering considerable friction to the material treated, though I prefer to use the material described.

In case the apparatus is to be used for extracting rubber from the milk or sap of rubber-trees I contemplate the use of a portable machine similar to the one described, but smaller and capable of being driven by hand.

In the apparatus shown in Fig. 3, *a* represents a conveyer for supplying the separator 14 with gum-bearing material. The separator comprises an endless band, preferably of rubber belting 15, about three feet in width, which may have a roughened or corrugated outer surface and runs upon pulleys about twenty feet apart. One of these pulleys, 16, is mounted upon a driving-shaft and the other one, 18, is adjustably mounted, as shown, in order to provide for tightening the belt. Upon the belt 15 and equal in width thereto rests a friction member 19. This may be a strip of rubber belting similar to the belt 15, or it may be a hard-wood plank or a strip of sheet-iron or other metal, which may preferably be slightly corrugated or roughened.

One end of this member is upturned, as shown at 20, in order that the material may be readily drawn in between the parts 15 and 19. The member 19 is of practically the same width as the belt 15. 21 is a shallow trough inclosing the parts 15 and 19, its sides acting as guards to prevent the escape of any of the gum-bearing material from between the side edges of 15 and 19. This trough also acts as a support for the parts 15 and 19. The member 19 may be reciprocated, if desired, in order to increase the rubbing effect on the material treated. I have shown a crank and pitman for this purpose, though it is evident that other means may be employed. When the part 19 is of flexible material, a pitman and crank may be connected to each end. The pressure of the part 19 upon the belt 15 may be regulated at will by means of weights (not shown) placed upon 19. 22 represents a scraper for removing the extracted material from the belt 15, and 23 is a sprinkler for cleansing it of the refuse adhering thereto after passing 22. The operation of this form of apparatus will be evident from the description of the operation of the apparatus of Figs. 1 and 2.

What I claim, and desire to secure by Letters Patent, is—

1. In an apparatus for extracting gum, two coöperating members having disintegrating rubbing-surfaces composed of yielding material and held in rubbing contact with each other, substantially as described.

2. In an apparatus for extracting gum, two coöperating members having disintegrating rubbing-surfaces composed of yielding material and held in rubbing contact with each other for a considerable distance, substantially as described.

3. In an apparatus for extracting gum, two coöperating members having disintegrating rubbing-surfaces which are held in rubbing contact with each other for a considerable distance, one of said surfaces being composed of a yielding material, substantially as described.

4. In an apparatus for extracting gum two coöperating members having disintegrating rubbing-surfaces of approximately the same width, which are held in rubbing contact with each other for a considerable distance, and guards independent of said surfaces and covering the side edges of said surfaces, substantially as described.

5. In an apparatus for extracting gum, a traveling member having an endless disintegrating-surface and a belt, or apron, adjacent to the said surface, for a considerable portion of its length, and means for holding said belt in rubbing contact with said surface, substantially as described.

In witness whereof I have hereunto set my hand this 19th day of August, 1902.

WILLIAM A. LAWRENCE.

Witnesses:
    MACDONALD DE WITT,
    DELOS HOLDEN.